Jan. 24, 1956 J. R. ANDERSON 2,732,528

WAVE FILTER

Filed June 6, 1952

INVENTOR
J. R. ANDERSON
BY
Ralph P. Holcomb
ATTORNEY

United States Patent Office 2,732,528
Patented Jan. 24, 1956

2,732,528

WAVE FILTER

John R. Anderson, Berkeley Heights, N. J., assignor to Bell Telephone Laboratories, Incorporated, New York, N. Y., a corporation of New York Application June 6, 1952, Serial No. 292,075

10 Claims. (Cl. 333—75)

This invention relates to wave transmission networks and more particularly to wave filters.

The object of the invention is to suppress alternating-current interference while freely transmitting unidirectional signal pulses.

In wave transmission circuits it is sometimes desired to discriminate against unwanted alternating-current interference without appreciably reducing the amplitude of transmitted direct-current signal pulses. For example, a network of this type is required at central offices in connection with circuits for periodically scanning dial pulses originated by telephone subscribers. Properly combined filter sections of the ladder type, comprising a series resistor and a shunt capacitor or a series capacitor and a shunt resistor, are effective in suppressing alternating-current interference, but they have the serious disadvantage of greatly reducing the amplitude of the pulses.

In accordance with the present invention, this difficulty is overcome by using ladder-type, resistance-capacitance filter sections to which are added rectifiers connected in shunt with certain of the resistors. The preferred circuit comprises a parallel-T network terminated in a low-pass, L-type section, with the series impedance branch of the latter facing the parallel-T network. The parallel-T network comprises two T's connected in parallel. One of the T's is made up of two series resistors and an interposed shunt capacitor. The other T is constituted by two series capacitors and an interposed shunt impedance branch comprising the parallel combination of a resistor and a rectifier. The low-pass section comprises a shunt capacitor and a series impedance branch which includes the parallel combination of a resistor and a rectifier. In order to limit the current through the last-mentioned rectifier, another resistor may be included in series with it. The component elements of the parallel-T network may be proportioned to provide high discrimination against the most troublesome frequency band of the alternating-current interference. However, if the rectifiers are omitted, the filter circuit will greatly reduce the amplitude of the unidirectional pulses. But when the rectifiers are added, the pulses are transmitted through the filter with substantially undiminished amplitude, without seriously impairing its band-rejection characteristics. Generally, the rectifiers should have a comparatively low shunt capacitance. For this reason, germanium rectifiers are preferred, but those of the copper oxide or silicon type, or thermionic diodes, may be used. Under some circumstances, the parallel-T network and the L-type section are useful individually.

The nature of the invention and its various objects, features, and advantages will appear more fully in the following detailed description of a preferred embodiment illustrated in the accompanying drawing, of which Fig. 1 shows schematically a transmission circuit including a wave filter in accordance with the invention;

Figure 1:
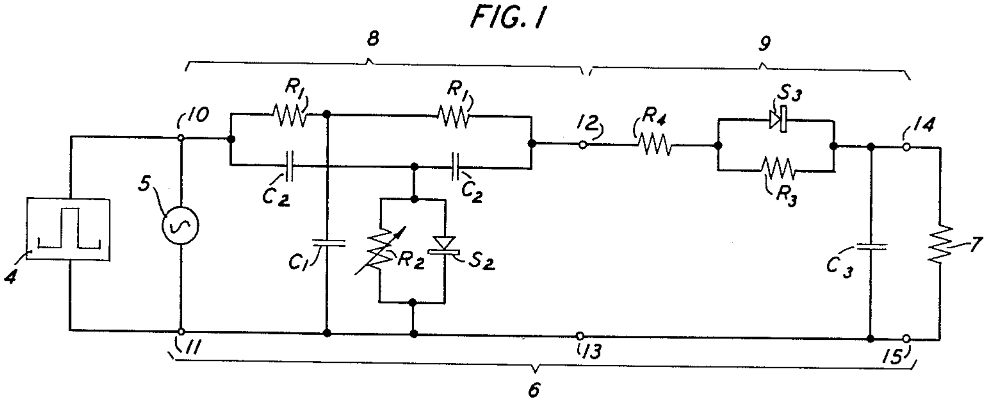

In the transmission circuit shown in Fig. 1, unidirectional voltage pulses from a source 4 and alternating-current interference from a source 5 are passed through a composite filter 6 to a load impedance 7. The source 4 may, for example, be direct-current dial pulses originated by a telephone subscriber, and the source 5 may be 60-cycle induction noise picked up along the line. The load 7 may represent the input impedance of a circuit located at the central office for periodically scanning the dial pulses.

The filter 6 comprises a suppression-type section 8 and a low-pass section 9 connected in tandem between a pair of input terminals 10—11 and a pair of output terminals 14—15, with an intermediate pair of common terminals 12—13. The section 8, at the input end of the filter 6, is a parallel-T network of the general type disclosed in Patent No. 2,106,785, to H. W. Augustadt, issued February 1, 1938. It comprises two T's, ordinarily of symmetrical configuration, connected in parallel between the input terminals 10—11 and the intermediate terminals 12—13. One of the T's consists of two series resistors designated by their values $R_1$, $R_1$ and an interposed shunt capacitor of value $C_1$. The other T is made up of two series capacitors designated by their values $C_2$, $C_2$ and an interposed shunt impedance branch consisting of the parallel combination of a resistor of value $R_2$ and a rectifier $S_2$. If the component elements have the relationship $$R_1C_1=4R_2C_2 \qquad (1)$$

the network 8 will freely pass unidirectional current but will have maximum insertion loss at a preassigned frequency $f_0$ given by $$f_0=\frac{1}{\pi R_1\sqrt{2C_1C_2}} \qquad (2)$$

Ordinarily, the frequency $f_0$ is chosen to coincide with the most troublesome frequency $f$ of the interference to be suppressed, but some other frequency may be selected. A more detailed discussion of the design and the transmission characteristics of a parallel-T network of this general type will be found in the above-mentioned patent.

For best performance, the network 8 should work into a high impedance. This is furnished by the terminating L-type section 9, the series branch of which faces the network 8. The filter section 9 comprises a shunt capacitor $C_3$ and a series impedance branch comprising a resistor $R_4$ in series with the parallel combination of a resistor $R_3$ and a rectifier $S_3$. The main function of the series resistor $R_4$ is to limit the current reaching the rectifier $S_3$ when the latter is conducting. It is apparent, therefore, that the resistor $R_3$ may be connected in parallel with both $R_4$ and $S_3$, instead of shunting $S_3$ only, as shown. The section 9 has a low-pass transmission characteristic and will, therefore, freely pass the unidirectional pulses while contributing materially to the suppression of sharp transient peaks aded to the unidirectional pulses when they pass through the parallel-T network 8.

For best performance of the filter 6, the shunt capacitances associated with the rectifiers $S_2$ and $S_3$ should be comparatively small. Germanium rectifiers have this property and are, therefore preferred. However, thermionic diodes or rectifiers of the copper oxide or silicon type may be used. The poling of the rectifiers $S_2$ and $S_3$ depends upon the polarity of the unidirectional pulses from the source 4. The poling shown in Fig. 1 is for positive going pulses, that is, pulses in which the leading edge rises in the positive direction. For negative going pulses, the poling of the rectifiers should be reversed from that shown.

Figure 2:
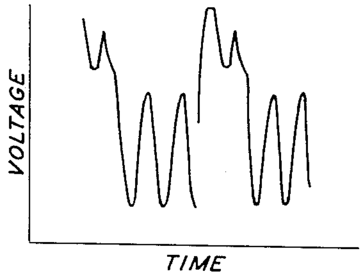
Fig. 2 is an oscilloscope trace of an unfiltered signal.
Figure 3:
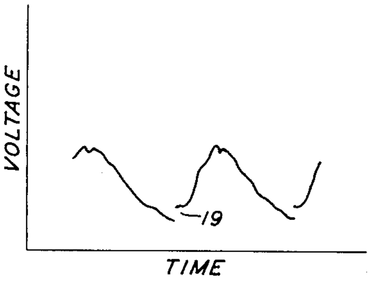
Fig. 3 shows the same signal after passing through the filter circuit of Fig. 1.

Fig. 2 is an oscilloscope trace showing the voltage versus time characteristic of an unfiltered input signal which exhibits a prominent 60-cycle interference component. Fig. 3 represents an oscilloscope trace of the same signal as it appears at the output terminals 14 and 15, after passing through the filter 6. It is seen that the 60-cycle interference has been substantially suppressed.

Figure 4:
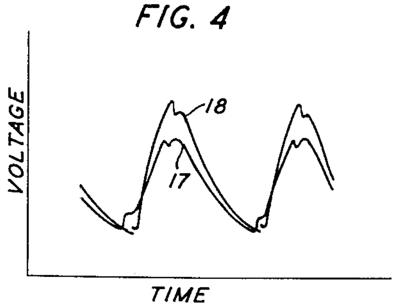
Fig. 4 shows the increase in the amplitude of the filtered pulses obtainable by adding the rectifiers to the circuit of Fig. 1.

The two oscilloscope traces in Fig. 4 show the increase in pulse amplitude attributable to the addition of the rectifiers $S_2$ and $S_3$ when a square-topped pulse from the source 4 passes through the filter 6. The characteristic 17 was obtained with the rectifiers omitted, and the characteristic 18 resulted when the rectifiers were added to the circuit, with all of the other component elements unchanged. It is apparent that the amplitude of the output pulse is greatly increased by the addition of the rectifiers. When the rectifier $S_2$ is added, it may be necessary to adjust slightly the value of the associated resistor $R_2$ if the frequency $f_0$ of the network 8 is to remain unchanged. As indicated by the arrow, the resistor $R_2$ may be made adjustable for this purpose. Although no interference from the source 5 was present when the characteristics 17 and 18 were taken, substantially the same improvement in pulse amplitude is obtained when interference is present.

The increase in pulse amplitude is due largely to the addition of the rectifier $S_3$ in the filter section 9. The rectifier $S_3$ is effective for this purpose because it is a good conductor during the pulse period and therefore provides a low impedance shunt around the resistor $R_3$ In the absence of the rectifier $S_2$, however, the resultant output pulse has an undesired sharp peak on the rising edge. The addition of the rectifier $S_2$ in the network 8 substantially eliminates this peak. The remanent, appearing at the point 19 on the characteristic shown in Fig. 3, is not troublesome. When the two rectifiers $S_2$ and $S_3$ are included, it is apparent that the filter sections 8 and 9 cooperate to provide a very efficient arrangement for suppressing unwanted alternating-current interference while freely transmitting unidirectional pulses.

The characteristics shown in Figs. 3 and 4 were obtained with the filter circuit of Fig. 1 in which the component elements have the following values:

$C_1$=0.1 microfarad
$C_2$=0.005 microfarad
$C_3$=0.03 microfarad
$R_1$=56,000 ohms
$R_2$=29,000 ohms
$R_3$=220,000 ohms
$R_4$=100 ohms The rectifiers $S_2$ and $S_3$ are of the germanium type, with good current carrying capacity and with back resistances, respectively, of 0.75 megohm and one megohm.

It is to be understood that the above-described arrangement is illustrative of the application of the principles of the invention. Numerous other arrangements may be devised by those skilled in the art without departing from the spirit and scope of the invention.

What is claimed is:

1. In combination, two wave filters connected in tandem, one of said filters comprising two T's connected in parallel, one of said T's comprising two series resistors each of value $R_1$ and an interposed shunt capacitor of value $C_1$ and the other of said T's comprising two series capacitors each of value $C_2$ and an interposed shunt impedance branch including the parallel combination of a resistor value $R_2$ and a rectifier, and the other of said filters comprising a shunt capacitor and a series impedance branch including the parallel combination of a resistor and a rectifier, the terminals of like polarity of said rectifiers being connected, respectively, through low impedance paths to opposite sides of said shunt capacitor.

2. The combination in accordance with claim 1 in which said series branch of said other filter comprises resistive means for limiting the current through said rectifier.

3. The combination in accordance with claim 1 in which said series branch of said other filter is located between said one filter and said shunt capacitor of said other filter.

4. The combination in accordance with claim 1 in which the terminals of said rectifiers connected to said shunt capacitor are the cathodes.

5. The combination in accordance with claim 1 in which the product $C_1R_1$ is approximately equal to four times the product $C_2R_2$.

6. The combination in accordance with claim 1 in which said other filter provides a high terminating impedance for said one filter.

7. A wave filter comprising two T's connected in parallel, one of said T's comprising two series resistors each of value $R_1$ and an interposed shunt capacitor of value $C_1$, and the other of said T's comprising two series capacitors each of value $C_2$ and an interposed shunt impedance branch including the parallel combination of a resistor of value $R_2$ and a rectifier, the anode of said rectifier being connected to the more positive end of said resistor value $R_2$.

8. The combination in accordance with claim 7 in which $C_1R_1$ equals approximately $4R_2C_2$.

9. In combination, a filter in accordance with claim 7 and a high impedance termination connected thereto.

10. The combination in accordance with claim 7 in which said anode is connected to the common terminal of said series capacitors.

References Cited in the file of this patent

UNITED STATES PATENTS

| | | |
|---|---|---|
| 2,106,785 | Augustadt | Feb. 1, 1938 |
| 2,137,401 | Hobbie | Nov. 22, 1938 |
| 2,367,746 | Williams | Jan. 23, 1945 |
| 2,511,468 | Harrison | June 13, 1950 |
| 2,565,497 | Harling | Aug. 28, 1951 |
| 2,585,571 | Mohr | Feb. 12, 1952 |

FOREIGN PATENTS

| | | |
|---|---|---|
| 409,360 | Great Britain | Apr. 30, 1934 |